United States Patent [19]

Koehr et al.

[11] Patent Number: 4,723,594
[45] Date of Patent: Feb. 9, 1988

[54] RADIATOR ARRANGEMENT FOR THE FRONT OF A MOTOR VEHICLE

[75] Inventors: Robert Koehr, Neustadt; Anton Reichel, Ditzingen; Manfred Hochkoenig, Moeglingen; Hermann Burst, Rutesheim; Helmut Kretschmer, Waldaschaff, all of Fed. Rep. of Germany

[73] Assignee: Dr. Ing h.c.F. Porsche Aktiengesellschaft, Stuttgart, Fed. Rep. of Germany

[21] Appl. No.: 779,056

[22] Filed: Sep. 23, 1985

[30] Foreign Application Priority Data

Sep. 21, 1984 [DE] Fed. Rep. of Germany ... 8427839[U]

[51] Int. Cl.⁴ .......................... B60K 11/04; F01P 1/00
[52] U.S. Cl. .................................. 165/44; 123/41.49; 123/196 AB; 180/68.1; 180/68.4
[58] Field of Search .................. 165/41, 44; 180/68.1, 180/68.2, 68.4; 123/41.33, 41.49, 41.51, 41.7, 196 AB

[56] References Cited

U.S. PATENT DOCUMENTS

| | | | |
|---|---|---|---|
| 1,754,257 | 4/1930 | Britt | 165/44 |
| 2,101,627 | 12/1937 | Nallinger | 123/41.49 |
| 2,153,535 | 4/1939 | Gregorie | 180/68.1 |
| 2,162,526 | 6/1939 | Buick | 165/44 |
| 2,191,599 | 2/1940 | Valletta | 180/68.1 |
| 2,274,442 | 2/1942 | Woods | 180/68.4 |
| 2,358,663 | 9/1944 | Scott-Iversen | 180/68.2 |
| 2,423,175 | 7/1947 | Churchill et al. | 165/44 |
| 2,766,836 | 10/1956 | Fessia | 180/68.2 |
| 3,552,483 | 1/1971 | North | 123/41.49 |
| 3,696,730 | 10/1972 | Masuda et al. | 180/68.1 |
| 3,933,136 | 1/1976 | Burst | 180/68.1 |
| 4,059,080 | 11/1977 | Rudert | |
| 4,116,269 | 9/1978 | Ikeda | 123/41.49 |
| 4,438,732 | 3/1984 | Seifert | 180/68.1 |
| 4,566,407 | 1/1986 | Petei | 180/68.4 |
| 4,604,974 | 8/1986 | Watanabe | 237/12.3 A |

FOREIGN PATENT DOCUMENTS

| | | |
|---|---|---|
| 1616796 | 11/1950 | Fed. Rep. of Germany . |
| 846037 | 8/1952 | Fed. Rep. of Germany ... 123/41.49 |
| 3317488 | 8/1984 | Fed. Rep. of Germany . |
| 630262 | 11/1927 | France ........................... 165/140 |
| 1034340 | 7/1953 | France ........................... 180/68.2 |
| 228110 | 3/1926 | United Kingdom ............. 180/68.4 |
| 253419 | 6/1926 | United Kingdom ............. 165/140 |
| 831597 | 3/1960 | United Kingdom ............. 180/68.1 |
| 1380874 | 1/1975 | United Kingdom ............. 180/68.1 |
| 1488257 | 10/1977 | United Kingdom ............. 180/68.1 |
| 2002704 | 2/1979 | United Kingdom ............. 180/68.4 |
| 2060524 | 5/1981 | United Kingdom . |

Primary Examiner—William R. Cline
Assistant Examiner—John K. Ford
Attorney, Agent, or Firm—Barnes & Thornburg

[57] ABSTRACT

A radiator arrangement for a motor vehicle has air inlet openings in the front of the arrangement and lateral air discharge openings. The arrangement is composed of an air guiding housing which has two separated spaces for receiving the water radiator and the oil radiator respectively. Separate air inlet ducts are provided for the spaces and a combined air guiding duct combines the air flows downstream of the radiators. The air is then discharged through lateral discharge openings in the side walls of the vehicle located ahead of the front wheels.

14 Claims, 2 Drawing Figures

RADIATOR ARRANGEMENT FOR THE FRONT OF A MOTOR VEHICLE

BACKGROUND AND SUMMARY OF THE INVENTION

This invention relates to a radiator arrangement in the front end of a motor vehicle having air inlet openings on lateral air discharge openings adjacent to the front.

The arrangement of an oil radiator and a water radiator in the front end of a motor vehicle with a forward engine is shown by DE-Gm 16 16 796. The water radiator is arranged in the engine space, and the oil radiator lies in a horizontal plane extending approximately in the area of the lower edge of the water radiator. Air is led to the water radiator and to the oil radiator via openings at the front end. The air flows through the water radiator into the engine space. The air led to the oil radiator is discharged through openings in the floor of the vehicle. In the combined air supply space bordered by the radiators and the walls of the vehicle body, the air coming in from the outside is detrimentaly heated so that this heated air is, for example, supplied to the oil radiator. Because the air led to the oil radiator is discharged through openings in the floor, swirling will occur, accompanied by an impairment of the discharge of air and the creation of an undesirable lift at the front axle of the vehicle.

It is an objective of this invention to provide a radiator arrangement in the front end of a motor vehicle having air inlet openings on the front end and lateral air discharge openings adjacent to the front end by means of which a favorable supply and discharge of the introduced air can be achieved to obtain an optimal cooling performance.

One of the main advantages achieved by means of this invention is the supplying of air to both radiators via separate duct-type spaces so that there is no mixing of the air supplied to the water radiator and to the oil radiator. Another advantage is the ensuring of a fast flow of air to the air discharge openings by means of a combined discharge duct behind the two radiators. Relative to the driving direction, the air discharge openings are arranged in front of the wheel and in the side walls of the body structure and are preferably provided in vacuum areas so that the air can be discharged quickly in an optimal fashion.

Unfavorable effects caused by the heated air on, for example, the brake system, are avoided by means of this invention. Also avoided is a lifting effect caused by large quantities of air flowing under the floor of the vehicle. This is because the air can flow without impairment from the front end of the vehicle to the openings in the side wall so as to be discharged without swirling.

In a preferred embodiment of the invention, the lateral discharge openings are arranged approximately in the same horizontal plane as the inlet openings in the front of the vehicle. This arrangement of the openings also has an advantageous effect on the drag coefficient. By means of additional discharge openings in the floor or elsewhere, small quantities of air can be branched off in order to avoid an excessive admission of air to the radiators.

Further objects, features, and advantages of the present invention will become more apparent from the following description when taken with the accompanying drawings, which show for purposes of illustration only, an embodiment constructed in accordance with the present invention.

DETAILED DESCRIPTION OF THE DRAWINGS

Figure 1:
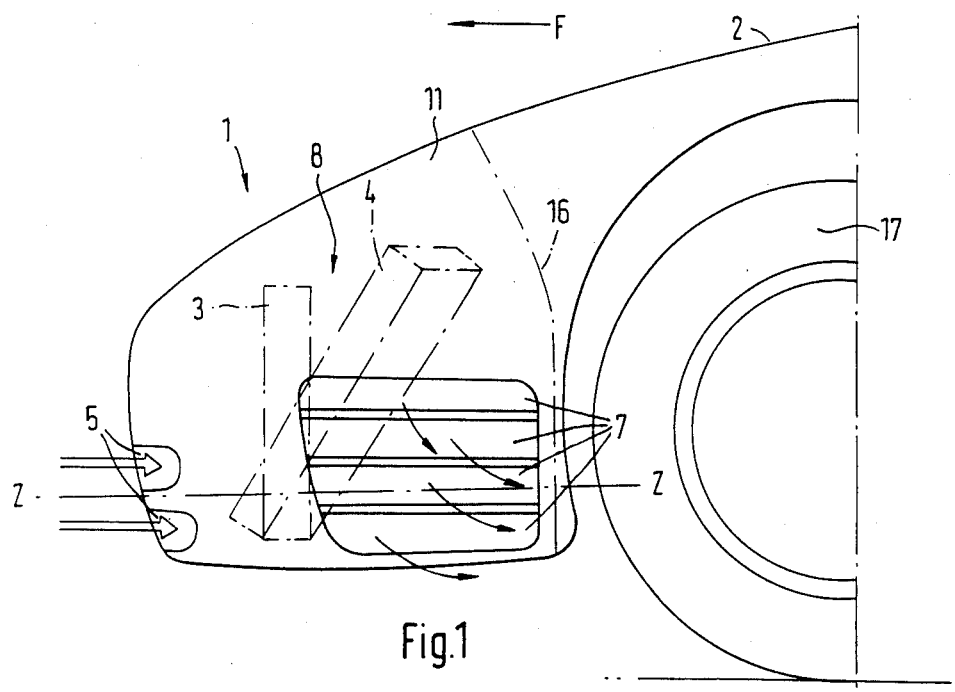
FIG. 1 is a lateral view from the front end of a vehicle with a diagrammatically indicated water radiator and oil radiator as well as air inlet and discharge constructed openings in accordance with a preferred embodiment of the present invention.

FIG. 1 shows a water radiator 3 and an oil radiator 4 arranged in the front end 1 of a motor vehicle 2. Air is supplied to the water radiator 3 via the inlet openings 5 and to the oil radiator 4 via the inlet openings 6 in the front wall (see FIG. 2). A discharge of air takes place via the discharge openings 7 on the side or lateral walls.

Figure 2:
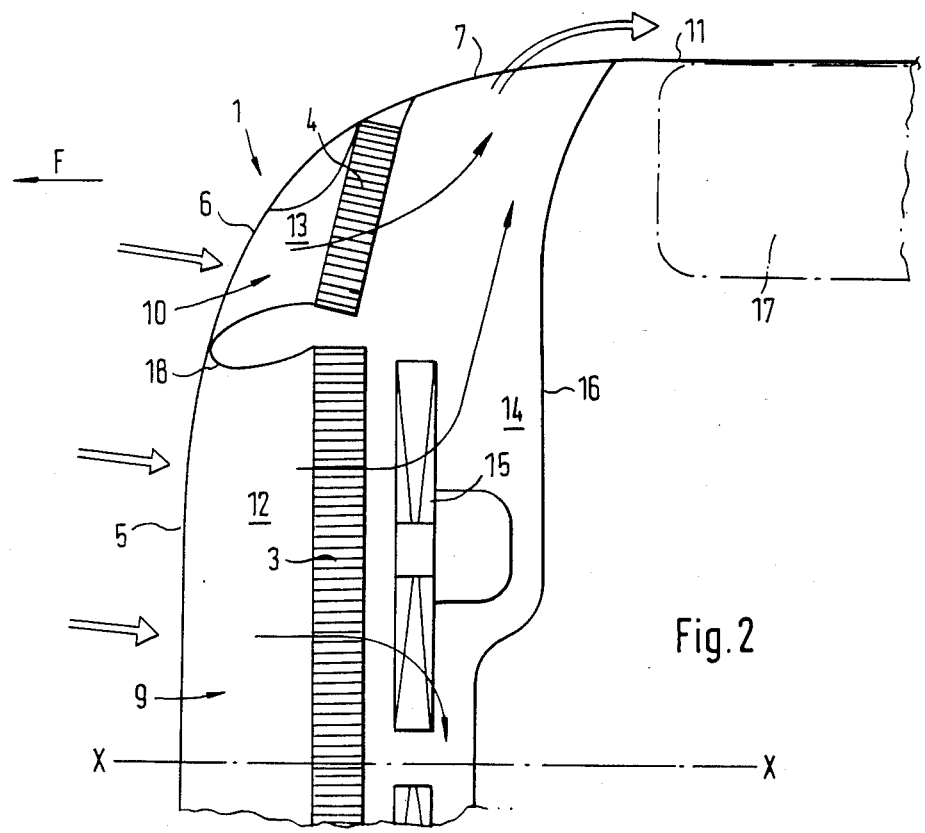
FIG. 2 is a schematic plan view of the embodiment of FIG. 1.

The two radiators 3 and 4 are arranged in an air-guiding housing 8 which is essentially closed on all sides and separate from the engine. As seen in FIG. 2, it has a first space 9 for receiving the water radiator 3 and a second space 10 for receiving the oil radiator 4. In the preferred embodiment, as shown in FIG. 2, only one oil radiator is provided, located on the side of the vehicle. The first space 9 and the second space 10 are separated by a wall 18. Separate air inlet openings 5, 6 provide separate flows of air from the front of the vehicle to spaces 9 and 10 respectively. The air is discharged from both spaces 9, 10 through air discharge openings 7. In a preferred embodiment of the arrangement, discharge openings 7 located in the side walls 11 of the body structure and have several longitudinal slots arranged vertically. With respect to the driving direction F, they are placed ahead of the front wheels 17.

Preferred embodiments provide for outflow of air through discharge openings 7 at both lateral sides of the vehicle with the air guiding housing 8 configured to accommodate uniform flow at both sides.

The water radiator 3 extends in both directions from the longitudinal plane X—X of the vehicle 2 in the first space 9. The oil radiator 4 is located in the second space 10 which is adjacent to the first space 9 and is bounded by the side wall 11. The oil radiator 4 and the water radiator 3 are connected to the engine oil and water cooling circuits respectively.

The receiving spaces 9 and 10 form duct-type inlets 12, 13 in front of the radiators 3, 4, relative to the driving direction F respectively. The inlets 12, 13 form a continuous air-guiding duct 14 in the area behind the radiators 3, 4, bordered by a transverse wall 16 of the vehicle 2. In this duct 14, ventilators or fans 15 are arranged behind the water radiator 3.

In a preferred embodiment, the inlet openings 5, 6 are located in a high-pressure area of the vehicle and lie in nearly the same horizontal plane Z—Z as the discharge openings 7, which are located in vacuum areas, which are produced along with the high-pressure area, by motion of the vehicle. This arrangement provides a rapid flow of air through the air-guiding housing 8.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A radiator arrangement for the front of a motor vehicle, comprising:
   an air guiding housing means adjacent an engine compartment with a first duct means and a second duct means,
   a first radiator disposed in said first duct means,
   a second radiator disposed in said second duct means,
   a discharge opening for discharging air from said air guiding housing means laterally out of said vehicle,
   separate inlet ducts located in front of said radiators and respectively connected to said first and second duct means, and separately communicating said first and second duct means with the front of said motor vehicle,
   common air-guiding duct means located behind said radiators and connected to said discharge opening for combining air flowing through both said radiators and out said discharge opening, such that said air flowing through said radiators is directed towards said discharge opening;
   further comprising ventilators situated in said common air-guiding duct means only behind said first radiator whereby a forced air flow is induced only through said first radiator.

2. A radiator arrangement for the front of a motor vehicle, comprising:
   an air guiding housing means adjacent an engine compartment with a first duct means and a second duct means,
   a first radiator disposed in said first duct means,
   a second radiator disposed in said second duct means,
   a discharge opening for discharging air from said air guiding housing means laterally out of said vehicle,
   separate inlet ducts located in front of said radiators and respectively connected to said first and second duct means, and separately communicating said first and second duct means with the front of said motor vehicle;
   common air-guiding duct means located behind said radiators and connected to said discharge opening for combining air flowing through both said radiators and out said discharge opening, such that said air flowing through said radiators is directed towards said discharge opening;
   wherein said first duct means extends from both sides of a longitudinal central plane of said vehicle, and wherein said second duct means is bounded by said first duct means and a side wall of said vehicle; and
   further comprising ventilators situated in said common air-guiding duct means only behind said first radiator whereby a forced air flow is induced only through said first radiator.

3. An arrangement according to claim 2, wherein said air guiding housing means is substantially enclosed and separate from the engine of said vehicle.

4. An arrangement according to claim 2, wherein two said air discharge openings are provided in the left and right side walls respectively, of said vehicle forward of a front wheel of said vehicle.

5. An arrangement according to claim 4, wherein said air discharge openings are configured such that the flow of air through said air discharge openings is uniform.

6. An arrangement according to claim 2, wherein said air inlet, and said air discharge openings are in approximately the same horizontal plane.

7. An arrangement according to claim 2, wherein said second radiator and said first radiator are connected to the engine oil and water cooling circuits respectively.

8. A radiator arrangement for the front of a motor vehicle, comprising:
   an air guiding housing means adjacent an engine compartment with a first duct means and a second duct means,
   a first radiator disposed in said first duct means,
   a second radiator disposed in said second duct means,
   a discharge opening for discharging air from said air guiding housing means laterally out of said vehicle,
   separate inlet ducts located in front of said radiators and respectively connected to said first and second duct means, and separately communicating said first and second duct means with the front of said motor vehicle;
   common air-guiding duct means located behind said radiators and connected to said discharge opening for combining air flowing through both said radiators and out said discharge opening, such that said air flowing through said radiators is directed towards said discharge opening;
   further comprising third duct means in said air-guiding housing means, a third radiator disposed in said third duct means, a second discharge opening for discharging air from said air-guiding housing means laterally out of said vehicle, a further separate inlet duct located in front of said third radiator and connected to said third duct means, wherein said common air-guiding duct means is located behind said third radiator and is connected to said additional discharge opening for combining air flowing through said radiators and out said additional discharge openings; and
   further comprising ventilators situated in said common air-guiding duct means only behind said first radiator whereby a forced air flow is induced only through said first radiator.

9. An arrangement according to claim 2, further comprising third duct means in said air-guiding housing means, a third radiator disposed in said third duct means in said substantially common plane with said first and second radiators, a second discharge opening for discharging air from said air-guiding housing means laterally out of said vehicle, a further separate inlet duct located in front of said third radiator and connected to said third duct means, wherein said common air-guiding duct means is located behind said third radiator and is connected to said additional discharge opening for combining air flowing through said radiators and out said additional discharge opening.

10. An arrangement according to claim 8, wherein said air guiding housing means is substantially enclosed and separate from the engine of said vehicle.

11. An arrangement according to claim 8, wherein said air discharge openings are provided in the left and right side walls respectively, of said vehicle forward of a front wheel of said vehicle.

12. An arrangement according to claim 11, wherein said air discharge openings are configured such that the flow of air through said air discharge openings is uniform.

13. An arrangement according to claim 8, wherein said air inlet and said air discharge openings are in approximately the same horizontal plane.

14. An arrangement according to claim 8, wherein said second radiator and said first radiator are connected to the engine oil and water cooling circuits respectively.

* * * * *